(12) United States Patent
Hart et al.

(10) Patent No.: US 10,365,956 B2
(45) Date of Patent: *Jul. 30, 2019

(54) RISK-APPROPRIATE VALIDATION FOR LIVE OPERATING SYSTEM MIGRATION

(71) Applicant: INTERNATIONAL BUSINESS MACHINES CORPORATION, Armonk, NY (US)

(72) Inventors: Brian W. Hart, Austin, TX (US); Anil Kalavakolanu, Austin, TX (US); Bruce G. Mealey, Austin, TX (US); James A. Pafumi, Leander, TX (US); Vani D. Ramagiri, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/926,101

(22) Filed: Mar. 20, 2018

(65) Prior Publication Data

US 2018/0210767 A1    Jul. 26, 2018

Related U.S. Application Data

(63) Continuation of application No. 14/989,365, filed on Jan. 6, 2016, now Pat. No. 10,002,030, which is a
(Continued)

(51) Int. Cl.
*G06F 9/455* (2018.01)
*G06F 9/50* (2006.01)
(Continued)

(52) U.S. Cl.
CPC ........ *G06F 9/5088* (2013.01); *G06F 9/45558* (2013.01); *G06F 9/4856* (2013.01);
(Continued)

(58) Field of Classification Search
None
See application file for complete search history.

(56) References Cited

U.S. PATENT DOCUMENTS

| 7,970,852 B2 | 6/2011 | Allen et al. |
| 8,095,929 B1 * | 1/2012 | Ji ........................ G06F 9/4856 709/223 |

(Continued)

OTHER PUBLICATIONS

List of IBM Patents or Patent Applications Treated as Related dated Mar. 20, 2018, 2 pages.

*Primary Examiner* — Tammy E Lee
(74) *Attorney, Agent, or Firm* — Tutunjian & Bitetto, P.C.; David Quinn

(57) ABSTRACT

Methods for migrating a virtual machine instance between devices include scoring a received migration request against one or more rules in a rule database to generate one or more scores for the migration request. Each rule relates to one or more respective validation sets. Each score is compared to a respective threshold. The migration request is validated by only those validation sets that correspond to the scores that exceed the respective threshold. A virtual machine is migrated to a target device in accordance with the migration request responsive to successful validation by the validation sets used.

8 Claims, 4 Drawing Sheets

Related U.S. Application Data continuation of application No. 14/872,636, filed on Oct. 1, 2015, now Pat. No. 9,990,219.

(51) Int. Cl.
*G06F 16/185* (2019.01)
*G06F 16/21* (2019.01)
*G06F 9/48* (2006.01)

(52) U.S. Cl.
CPC .......... *G06F 16/185* (2019.01); *G06F 16/214* (2019.01); *G06F 2009/4557* (2013.01)

(56) References Cited

U.S. PATENT DOCUMENTS

| | | |
|---|---|---|
| 2006/0026587 A1 | 2/2006 | Lemarroy et al. |
| 2013/0014097 A1 | 1/2013 | Draper et al. |
| 2013/0152076 A1* | 6/2013 | Patel ................... G06F 9/45558 718/1 |
| 2014/0165063 A1* | 6/2014 | Shiva .................. G06F 9/45533 718/1 |
| 2016/0062853 A1* | 3/2016 | Sugabrahmam .... G06F 11/1471 714/4.11 |

* cited by examiner

RISK-APPROPRIATE VALIDATION FOR LIVE OPERATING SYSTEM MIGRATION

BACKGROUND

Technical Field

The present invention relates to migration of operating systems between physical devices and, more particularly, to risk aware validation of operating system migration.

Description of the Related Art

Virtual machines allow multiple client operating systems to run on a single physical device with various input/output (I/O) resources being virtualized by a virtual I/O server (VIOS). In addition, a given client operating system may be migrated between physical devices, transferring the client operating system and any workloads to the new device. Migration may be performed while the client is active and running.

These migrations, or "mobility events," are coordinated by a control point that communicates with the VIOSes on the source device and the VIOSes on the target device. Validation is performed to verify that the migration can be performed safely. During validation, the control point first establishes an inventory of the resources that are available to the client on the source device. It then confirms that sufficient and correct resources are available for the client operating system on the target device. If validation succeeds, then the control point initiates the migration.

Validation checks can take up a significant portion of the overall migration time. In addition, validation checks are often redundant, being performed regardless of how unlikely they are to fail.

SUMMARY

A method for migrating a virtual machine instance between devices includes scoring a received migration request against one or more rules in a rule database to generate one or more scores for the migration request. Each rule relates to one or more respective validation sets. Each score is compared to a respective threshold. The migration request is validated by only those validation sets that correspond to the scores that exceed the respective threshold. A virtual machine is migrated to a target device in accordance with the migration request responsive to successful validation by the validation sets used.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Figure 1:
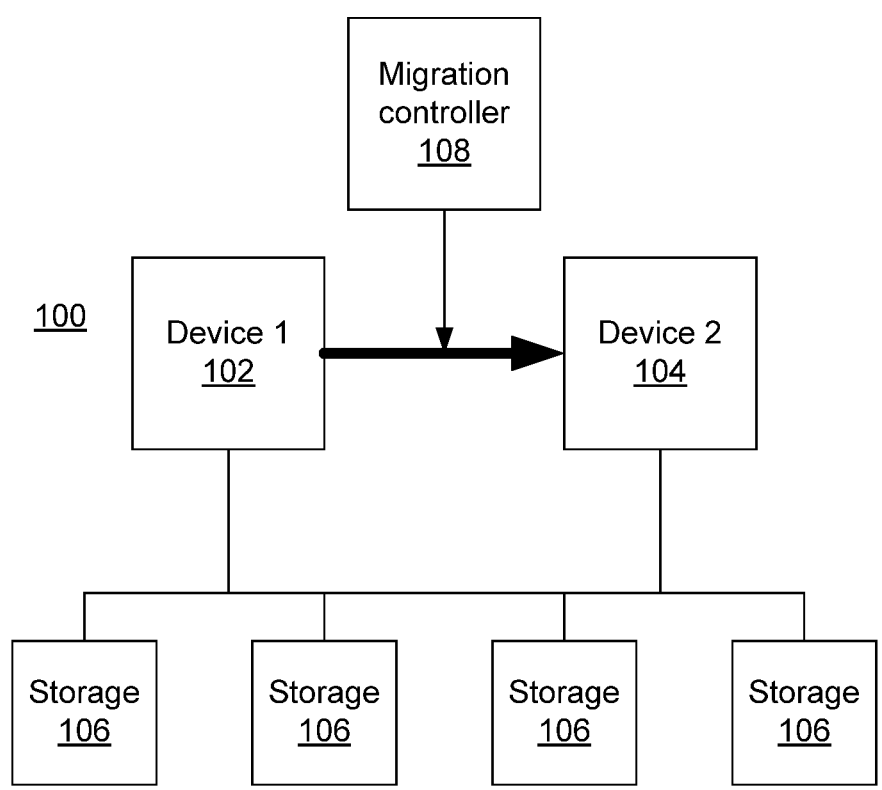
FIG. 1 is diagram of migrating a virtual machine instance in accordance with the present principles.

Embodiments of the present invention establishes distinct validation tasks that each address specific migration risks. When preparing to migrate a client operating system or virtual machine instance from a first device to a second device, factors relating to the source, destination, and broader environment are considered to determine which risks most threaten the migration. Appropriate validations are then performed to address those likely risks while other validations are not performed, substantially shortening the validation process.

Validations are therefore grouped into sets. A validation set may include, e.g., storage device access, which verifies that all needed storage devices are accessible by the destination device with adequate pathing redundancy; storage area network (SAN) bandwidth, which verifies that adequate bandwidth is available between the destination device and storage devices; network bandwidth, which verifies that adequate bandwidth is available between the destination device and important network peers; workload throughput, which verifies that the destination device can achieve some threshold level for an application benchmark and that the destination device has adequate processor and memory resources; and tunable sanity, which verifies that the migrating client operating system can boot in the destination virtual machine by, e.g., performing a tentative boot with write protection for the boot device.

In preparation for a migration, a set of applicable risks is determined and an appropriate set of validations is performed to mitigate those risks. Risks may include:

Migration between remote data centers. If a client operating system is being migrated between devices in different locations, the destination will have different attachments to SAN and internet protocol networks, which implies a risk to accessibility and throughput. In this case, validations should be performed on SAN device access, SAN bandwidth, and network bandwidth.

Migration to a remote device within a data center. If the device is more than a threshold number of hops away on the local network, then a validation on network bandwidth is performed.

Migration to a destination virtual machine with a slower processor or smaller memory size. In this case, validation is performed to verify that the destination virtual machine will have the computing resources needed to operate the transferred workload.

Migration to a destination virtual machine with fewer storage adapters. In this case, the availability of sufficient storage access is at risk. Validation is therefore performed on SAN device access and SAN bandwidth.

Tuning changes to the client operating system. If the migration in question is the first migration to be performed on the client operating system since a tuning change was made on the client operating system, validation is performed on the sanity of tuning parameters in the new environment.

Adding or removing storage. If the migration in question is the first migration since storage was added or removed from the client operating system, then validation on SAN device accessibility is performed.

Referring now to FIG. 1, migration of a client operating system is shown in a data center 100. The first and second devices 102/104 each run respective virtual input/output servers (VIOSes), also known as virtualization hosts or hypervisors. The first device 102 has at least one client virtual machine or client operating system image. One or more client operating systems are migrated from a first device 102 to a second device 104. In migration, the client operating system begins on the first device 102 and uses the services of the VIOS on that machine, with the intent of migrating the client operating system to the second device 104 without interruption. This migration may be performed over a network. Also connected to the network are one or more additional devices, such as storage devices 106 connected via an SAN.

The migration is controlled by migration controller 108, which performs any appropriate validations before triggering the migration. As noted above, the validations being performed may depend on the circumstances of the particular migration and the risks posed by those circumstances.

Figure 2:
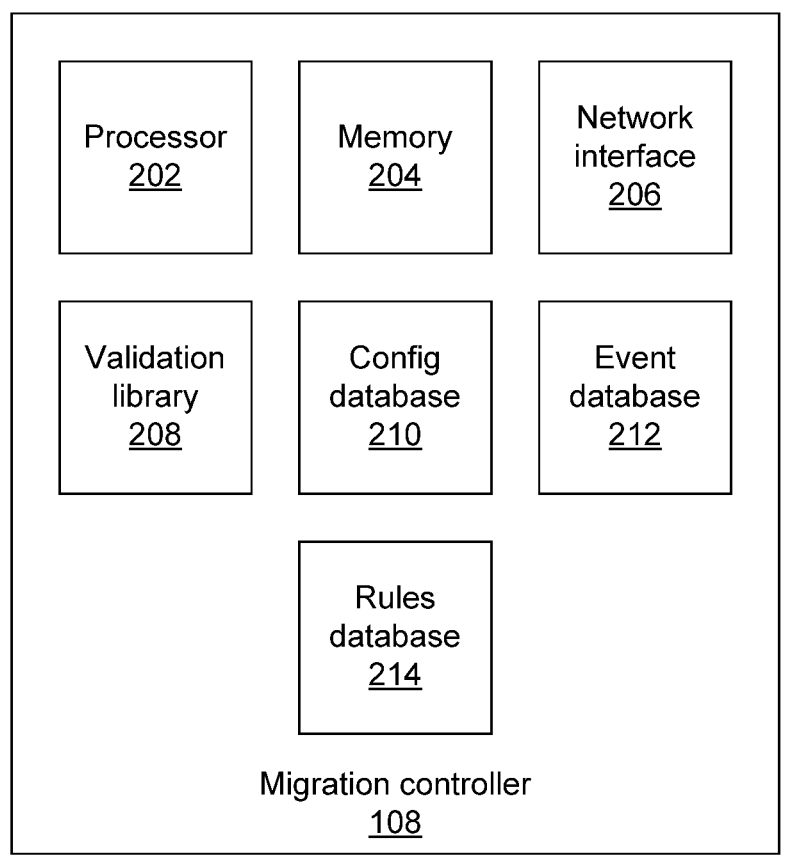
FIG. 2 is a block diagram of a migration controller in accordance with the present principles.

Referring now to FIG. 2, a block diagram of the migration controller 108 is shown. The migration controller 108 includes a hardware processor 202, a memory 204, and a network interface 206. It should be noted that other components of the migration controller may be implemented as software running on the processor 202 or may alternatively be implemented in hardware as, e.g., an application specific integrated chip or field programmable gate array.

A validation library 208 is stored in memory 204. Rather than using a monolithic set of validation tasks that are performed in every migration, the migration controller 108 instead uses a validation library that describes validation subtasks and categories as well as associated checks. The library may be provided by the VIOS vendor and may be built into the system or may be user or system modifiable.

An example of a substask in the library might be, for example, SAN storage validation. In this example, the subtask includes a set of subtasks and procedures as follows:
 1. Gather data on source VIOS. For each virtual Fibre Channel adapter assigned to the client, determine:
   a. the SAN fabric to which the virtual adapter is attached;
   b. the storage target ports visible to the client; and
   c. for each storage target port, the list of Logical Units visible to the client.
 2. Validate accessibility on the target VIOS. For each virtual Fibre Channel adapter on the client:
   a. search for a physical backing adapter on the target that can attach to the corresponding SAN fabric;
   b. masquerade as the client to ensure that the same set of storage target ports are visible; and
   c. for each storage target port, masquerade as the client to ensure that the same set of Logical Units are visible.

This procedure is just one example of SAN storage validation and should not be construed as being limiting.

A configuration database 210 stores configuration information needed for the various validation subtasks. It includes information about the relationships between VIOSes and virtual machines and the locations of those machines. The configuration information may be hierarchical, for example noting first where a particular machine is hosted and next storing information about VIOSes stored on that machine. The configuration database 210 may also include information describing which physical adapters are assigned to the VIOSes and to which networks or switches they are attached. Similarly, the configuration database 210 stores information about clients, including which VIOS hosts them and which VIOS adapters are backing the client's virtual adapters. Other information, including the size of a client's memory, the number and type of processors assigned, and distance between pairs of components, may also be stored in the configuration database 210. The distance between pairs of components may be measured depending on the type of component, with some distances being measured in geographical distances and others being measured in logical distances such as a number of hops on a network.

An event database 212 stores information about validation-relevant events that have occurred on clients. Events can be reported by the migration controller 108 itself, with examples including migration start times, migration end times, and validation results; the VIOSes, with examples including storage reconfigurations; or by the clients, with examples including tuning changes. Event information may be general, such as noting that a configuration change occurred, or specific, such as noting that a tunable parameter was set to a specific value.

A rules database 214 stores rules that are used to score risks associated with a migration. The rules in the rules database 214 reference information in the configuration database 210, the event database 212, and a migration request to determine the risk score associated with the migration request. Scores are categorized similarly to the subtasks in the validation library 208.

For example, if the latest storage reconfiguration event for a migrating client is more recent than the latest SAN storage validation for the migrating client, then a SAN storage validation risk may be increased by a set number. If the distance between an Ethernet switch attached to an adapter backing the migrating client and an Ethernet switch attached to the proposed adapter for the migrating client is greater than a set number of hops, then the IP bandwidth risk is increased by a set number. If the requested memory size of the migrating client is smaller than the current memory size of the migrating client, then a transaction throughput risk may be increased by a set number. The rules database 214 may also store rules describing risk thresholds, beyond which a validation subtask from the validation library 208 is triggered. For example, if the SAN storage validation risk is above its respective threshold, then SAN storage validation is triggered.

The migration controller 108 receives a migration request from, e.g., a system operator or an automated management process such as a load balancer. The migration request may include various details of the migration, and specifically will include information that is fundamentally needed for the migration (such as identifying the client to be migrated and the target VIOS or device for the migration). Clients may also be reconfigured (e.g., resized, etc.) during a migration, so a migration request may also include information about the desired end-configuration of the client, including a number of processors to assign, an amount of memory to assign, and a number and type of virtual I/O adapters to attach.

Figure 3:
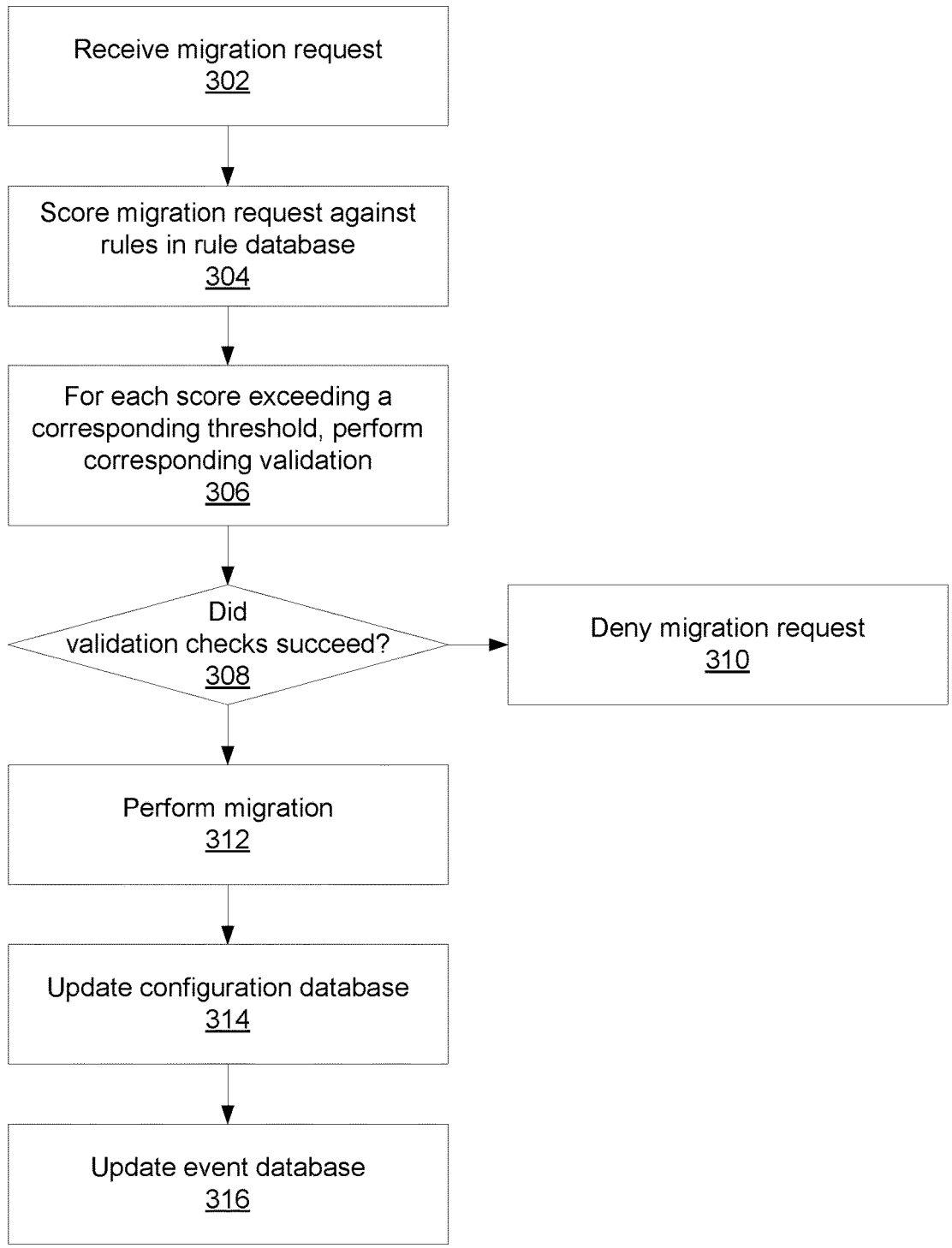
FIG. 3 is a block/flow diagram of a method for migrating a virtual machine instance in accordance with the present principles.

Referring now to FIG. 3, a method of performing a migration is shown. Block 302 receives a migration request to move a client operating system from one device to another. Block 304 scores the migration request against rules in the rule database to determine a risk for each of the types of validation that might be needed. Block 306 compares the scores for each type of risk against a corresponding threshold. If a score exceeds the threshold, block 306 performs the corresponding validation set to ensure that the migration may proceed safely. If block 308 determines that one or more validation checks failed, block 310 denies the migration request.

Otherwise, block 312 performs, or triggers the performance of, the migration. Block 314 updates the configuration database to reflect the fact that the client operating system is now located on a different device and block 316 updates the event database to include information regarding the fact that validation and a migration occurred.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
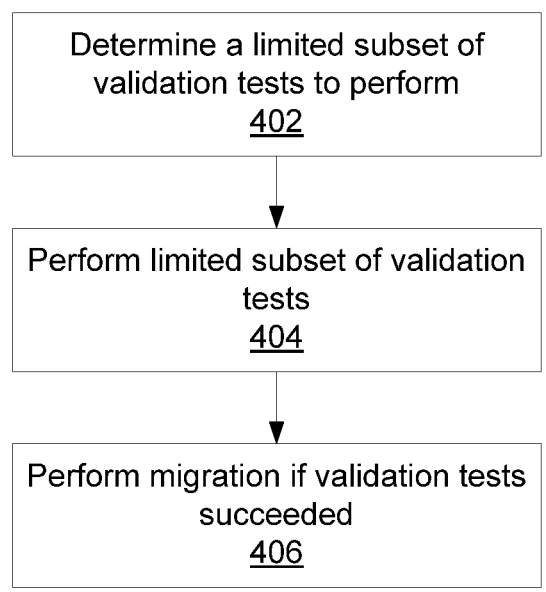
FIG. 4 is a block/flow diagram of a method for migrating a virtual machine instance in accordance with the present principles.

Referring now to FIG. 4, a block/flow diagram of an overview of the present principles is provided. Block 402 determines a limited subset of the available validation tests to perform based on a particular migration request, the source system, the target system, and any appropriate historical information. This may be accomplished as described above, by establishing that there is a low need for certain validation tests corresponding to a likelihood that those tests will be unnecessary or redundant. These tests are excluded from the set of available validation tests to form a limited subset of validation tests to be performed. Block 404 then performs the limited subset of validation tests. If the validation tests succeed, block 406 proceeds with the migration.

Having described preferred embodiments of risk-appropriate validation for live operating system migration (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims.

Having thus described aspects of the invention, with the details and particularity required by the patent laws, what is claimed and desired protected by Letters Patent is set forth in the appended claims.

The invention claimed is:

1. A method for migrating a virtual machine instance between devices, comprising:
    scoring a received migration request against a plurality of rules in a rule database, each rule relating to a different respective validation set, to measure a level of risk for respective validation sets;
    comparing each score to a respective threshold using a processor;
    validating the migration request by only those validation sets that correspond to the scores that exceed the respective threshold; and
    migrating a virtual machine to a target device in accordance with the migration request responsive to successful validation by the validation sets used.

2. The method of claim 1, wherein the validation sets include validation subtasks that handle one or more of storage device access checks, storage area network bandwidth checks, network bandwidth checks, workload throughput checks, and tunable sanity checks.

3. The method of claim 1, wherein validating by a validation set comprises referring to a configuration database that maintains information regarding the configuration of virtual machine instances and devices.

4. The method of claim 1, wherein the one or more rules comprise one or more rules that consider previous events described in an event database.

5. The method of claim 4, wherein the previous events comprise one or more of migration events, virtual machine instance tuning events, and changes to virtual machine instance configuration change events.

6. The method of claim 1, wherein each rule has a corresponding point value and wherein scoring comprises combining point values for violated rules.

7. The method of claim 1, wherein validating comprises omitting one or more validation sets having scores that did not exceed the respective threshold.

8. The method of claim 1, further comprising migrating the virtual machine instance to a target device only if the migration request passes all of the applied validation sets.

* * * * *